US012207377B2

(12) United States Patent
Kuchler et al.

(10) Patent No.: US 12,207,377 B2
(45) Date of Patent: Jan. 21, 2025

(54) COOKING APPLIANCE HAVING SENSOR UNITS ARRANGED OUTSIDE THE COOKING CHAMBER

(71) Applicant: BSH Hausgeräte GmbH, Munich (DE)

(72) Inventors: Markus Kuchler, Gstadt am Chiemsee (DE); Kerstin Rigorth, Mühldorf (DE); Sebastian Sterz, Großaitingen (DE); Matthias Vogt, Obersulm (DE)

(73) Assignee: BSH Hausgeräte GmbH, Munich (DE)

(*) Notice: Subject to any disclaimer, the term of this patent is extended or adjusted under 35 U.S.C. 154(b) by 700 days.

(21) Appl. No.: 17/441,307

(22) PCT Filed: May 12, 2020

(86) PCT No.: PCT/EP2020/063156
§ 371 (c)(1),
(2) Date: Sep. 21, 2021

(87) PCT Pub. No.: WO2020/229452
PCT Pub. Date: Nov. 19, 2020

(65) Prior Publication Data
US 2022/0167473 A1 May 26, 2022

(30) Foreign Application Priority Data
May 13, 2019 (DE) ..................... 10 2019 206 892.8

(51) Int. Cl.
*H05B 6/64* (2006.01)
*H05B 6/68* (2006.01)

(52) U.S. Cl.
CPC ......... *H05B 6/6455* (2013.01); *H05B 6/6411* (2013.01); *H05B 6/6458* (2013.01); *H05B 6/687* (2013.01)

(58) Field of Classification Search
CPC .. H05B 6/6455; H05B 6/6411; H05B 6/6458; H05B 6/687; F24C 7/085
(Continued)

(56) References Cited

U.S. PATENT DOCUMENTS 5,693,248 A * 12/1997 Kim ..................... H05B 6/6447 219/757
10,731,864 B2 8/2020 Wild
(Continued)

FOREIGN PATENT DOCUMENTS

EP 0924964 A2 6/1999
JP 2001349546 A 12/2001
(Continued)

OTHER PUBLICATIONS

Translation of KR 10-2016-0069344A, "Microwave Oven and method for controlling the same", Jun. 16, 2016, By ProQuest (Year: 2016).*
(Continued)

*Primary Examiner* — Quang T Van
(74) *Attorney, Agent, or Firm* — Michael E. Tschupp; Andre Pallapies; Bradnon G. Braun

(57) ABSTRACT

A cooking appliance includes a cooking chamber wall delimiting a cooking chamber and including an opening, and a motor-movable changing device arranged outside the cooking chamber and including at least two sensor units for detecting a property of the cooking chamber. The changing device can be set in such a way by motorized movement that one of the at least two sensor units can be positioned in front of the opening at a time for detecting the property of the cooking chamber through the opening.

18 Claims, 5 Drawing Sheets

(58) Field of Classification Search
USPC ........ 219/711, 704, 710, 707, 741, 757, 620
See application file for complete search history.

(56) References Cited

U.S. PATENT DOCUMENTS

| | | | | |
|---|---|---|---|---|
| 2010/0128755 | A1 | 5/2010 | Luckhardt | |
| 2016/0366314 | A1 | 12/2016 | Funk | |
| 2017/0303348 | A1 | 10/2017 | Ishimaru | |
| 2018/0347821 | A1 | 12/2018 | Wild | |
| 2022/0163213 | A1 * | 5/2022 | Adam | F24C 7/085 |

FOREIGN PATENT DOCUMENTS

| | | | |
|---|---|---|---|
| KR | 1020160069344 | A * | 6/2016 |
| WO | 2015141207 | A1 | 9/2015 |
| WO | 2016131109 | A1 | 8/2016 |

OTHER PUBLICATIONS

National Search Report DE 10 2019 206 892.8 dated Mar. 10, 2020.
International Search Report PCTÆEP2020/063156 dated Jul. 16, 2020.

* cited by examiner

COOKING APPLIANCE HAVING SENSOR UNITS ARRANGED OUTSIDE THE COOKING CHAMBER

CROSS-REFERENCES TO RELATED APPLICATIONS

This application is the U.S. National Stage of International Application No. PCT/EP2020/063156, filed May 12, 2020, which designated the United States and has been published as International Publication No. WO 2020/229452 A1 and which claims the priority of German Patent Application, Serial No. 10 2019 206 892.8, filed May 13, 2019, pursuant to 35 U.S.C. 119(a)-(d).

BACKGROUND OF THE INVENTION

The invention relates to a cooking appliance having a cooking chamber delimited by means of a cooking chamber wall, at least one sensor unit arranged outside the cooking chamber and an opening in the cooking chamber wall, through which opening at least one property of the cooking chamber can be detected by means of the at least one sensor unit. The invention can be applied particularly advantageously to household cooking appliances, in particular ovens and/or microwave devices.

WO 2015/141207 A1 discloses a cooking appliance, having an infrared sensor, which is provided outside a cooking chamber, and which uses a plurality of infrared sensor elements in order to acquire the temperature of an object to be heated; and a directional setting motor, which can change the direction of the infrared sensor. The cooking appliance is configured so that the direction of the infrared sensor is moved in relation to the temperature acquisition position when the temperature acquisition is carried out and the direction of the infrared sensor is moved in relation to a standby position, when no temperature acquisition is carried out. Consequently, it is possible to prevent the lens of the infrared sensor from becoming cloudy and a temperature of the infrared sensor from increasing. It is therefore possible, for instance, to keep the infrared sensor in a state in which it is possible to acquire the temperature even directly after steam heating.

EP 0 924 964 A2 discloses a microwave oven with an infrared sensor for acquiring the temperature of food during the cooking process. The infrared sensor is directed from the top front edge of the cooking chamber obliquely downward and rearward. A seal or screen protects the sensor when it is not required to acquire the food temperature.

BRIEF SUMMARY OF THE INVENTION

It is the object of the present invention to overcome the disadvantages of the prior art at least partially and in particular to provide an improved possibility of sensing measured values of a cooking chamber or an item of food located in the cooking chamber.

This object is achieved according to the features of the independent claims. Advantageous embodiments form the subject matter of the dependent claims, the description and the drawings.

The object is achieved by a cooking appliance, having a cooking chamber delimited by means of a cooking chamber wall, at least one sensor unit arranged outside the cooking chamber and an opening in the cooking chamber wall (also referred to below as "wall opening"), through which at least one property of the cooking chamber can be detected by means of the at least one sensor unit, wherein a motor-movable device ("changing device") is provided outside the cooking chamber, the changing device is equipped with at least two sensor units for detecting at least one property of the cooking chamber and the changing device can be set in such a way, by motorized movement, that one of the sensor units can be positioned in front of the opening at a time.

This cooking appliance is advantageous in that the wall opening can be used in a temporally offset manner by different sensor units. A particularly advantageous sensor position can therefore be used for all these sensor units. In the case that at least two of the sensor units are imaging sensor units (e.g. an optical camera and an IR camera), a further advantage consists in the images of these sensors being able to be overlayed without further adjustment since both image the cooking chamber or the item to be cooked from the same perspective. Only the actually required sensor unit is located at the wall opening in each case, so that the unused sensor units are protected against contamination (e.g. vapor, splashes of grease etc.) and/or the irradiation of heat rays from the cooking chamber through the wall opening. Another further advantage consists in heat loss from a hot cooking chamber being kept particularly low by providing just one wall opening for a number of sensor units.

The cooking appliance is advantageously a household cooking appliance. The cooking appliance is in particular an oven, a microwave device or a combination thereof, e.g. an oven with microwave function. The cooking appliance can also have a steam treatment function. In one development, the cooking chamber has a front loading opening, which can be closed by means of a door. In particular in the presence of an oven, the cooking chamber wall (without door) inside the appliance can also be referred to as a muffle.

The sensor unit can have one or more individual sensor elements. The sensor unit is in particular a separately manufactured unit which is fastened to the changing device.

In one development, the wall opening is in particular a free or permeable opening, i.e. an opening which is not permanently covered by means of a panel (e.g. a transparent glass panel) inter alia. This advantageously makes it possible to detect or measure the at least one property of the cooking chamber in an extremely uninfluenced manner. Alternatively, the wall opening can be covered permanently by a protective panel, if this is permeable for all sensor units using measurement technology, in other words allows the associated at least one property of the cooking chamber to be measured for all sensor units. If the sensor units comprise an optical camera and an IR camera, for instance, a permanent protective panel in the form of a panel which is see-through, in particular transparent for the optical and the relevant IR spectrum (e.g. NIR spectrum), can be provided.

The at least one property of the cooking chamber can comprise, for instance, a physical variable such as a brightness and/or color distribution onto a surface of the food to be cooked (e.g. in order to determine a degree of browning of the food to be cooked), a temperature of the cooking chamber, a temperature distribution onto one or more food surfaces, a humidity in the cooking chamber etc., and/or a chemical variable such as a portion of one or more chemical substances in a cooking chamber atmosphere, e.g. an oxygen percentage etc. A property of the cooking chamber can therefore comprise for instance a property of the cooking chamber atmosphere and/or a property of food to be cooked located in the cooking chamber.

The changing device provided outside the cooking chamber is accommodated in particular within the cooking appliance, for instance in an intermediate space between the cooking chamber wall and an outer housing of the cooking appliance. In one development, the changing device is arranged above the cooking chamber, because a particularly large amount of space is available there for its accommodation.

The changing device can be moved by motor in particular by means of at least one drive motor such as an electric motor, in particular stepper motor.

The fact that by moving the changing device (as a whole or in part) one of the sensor units can be moved or positioned in front of the wall opening means in particular that each of the sensor units is assigned a specific position (also referred to below as "active position"), in which this sensor unit can detect at least one associated property of the cooking chamber through the wall opening. Here only one of the sensor units can be located in front of the wall opening per time segment. The other sensor units are conversely arranged at a distance from the wall opening (which is also referred to below as "standby position") and cannot use this. The changing device can be used therefore to move the sensor units provided thereon alternately individually in front of the wall opening in the cooking chamber wall.

In one development, the motor is connected to a control device of the cooking appliance, in order to position the respective sensor unit, if necessary automatically, e.g. in a program-controlled and/or situation-dependent, e.g. event-controlled manner, in front of the wall opening.

In one embodiment, the changing device has a number of motor-movable supports, on which a sensor unit is arranged in each case. This embodiment is advantageous in that it can be embodied to be particularly versatile. The supports can assume in particular two settings or positions permanently in each case, namely the active position and the standby position. The supports can alternately be positioned in their active position. In one development, the supports can be folded down between their active position and their standby position. In one development, the supports, in particular foldable supports, are arranged in a ring-shaped manner about the wall opening. Here, in one development, each of the supports can be connected to an associated motor. Alternatively, all supports can be moved by means of a single motor.

In one embodiment, the changing device has a motor-movable support, on which the at least two sensor units are arranged. This support is therefore a shared support for the at least two sensor units. With the movement of this shared support, all sensor units arranged hereon are moved. This embodiment can be implemented particularly easily, robustly and cost-effectively.

In one embodiment, at least one of the sensor units has or is

- an optical sensor,
- a temperature sensor,
- a humidity sensor and/or
- a substance sensor.

The optical sensor can be an optical camera, e.g. an imaging digital camera, in particular a color camera. The temperature sensor can be a temperature probe or an imaging thermal image (IR) camera. The substance sensor can be an oxygen sensor, e.g. a Lambda probe. The substance sensor can be a spectrometer.

In one development, the changing device is additionally equipped with at least one cover which can be moved or positioned in front of the wall opening. This achieves the advantage of the opening in the cooking chamber wall being closable, and the sensor units being protected against influences from the cooking chamber such as heat (e.g. during a cooking process or a pyrolysis process) and/or contamination and moreover it being possible to keep a loss of heat from a hot cooking chamber particularly low.

In one development, the changing device can be adjusted so that the cover instead of the sensor units can be positioned in front of the wall opening. In particular, the cover can be arranged and moved similarly to a sensor unit. In the case that the changing device has a number of motor-movable supports, the cover instead of a sensor unit can be provided on one of the supports. In the case that the changing device has a motor-movable support, on which the at least two sensor units are arranged, the cover can also be provided on the support.

The cover provided on the support can be a separately manufactured component or an integral subregion of the support.

In one development, the changing device, additionally or alternatively to the afore-described cover fastened to a support, has a further cover, in the form of a protective panel, which can be moved in front of the wall opening, wherein this protective panel (contrary to a protective panel fastened permanently in front of the wall opening) is permeable for at least one of the sensor units using measurement technology, in other words permits measurement of the associated at least one property of the cooking chamber and is impermeable for at least one other of the sensor units using measurement technology. If, for instance, one of the sensor units is an optical camera and another of the sensor units is an IR camera, the movable protective panel can be a panel (e.g. a glass panel) which is permeable in the optical field, but not or not adequately permeable in the IR field. The changing device can be designed or activated so that the protective panel then covers the wall opening, when a sensor unit is located in front of the wall opening, for which the protective panel is permeable using measurement technology, and releases the wall opening when a sensor unit is located in front of the wall opening, for which the protective panel is impermeable using measurement technology. In one development, the protective panel only covers the wall opening if necessary or is only distanced from the (then free at times) wall opening, if necessary. The movement of the protective panel can also take place by motor.

In one embodiment, the cooking chamber wall in the region of the wall opening is formed as an in particular funnel or truncated cone-shaped protuberance, which extends in the direction of the cooking chamber. The protuberance may have been prefabricated as a standalone component. The protective panel can, if available, be moved in particular in front of the front face of the protuberance on the cooking chamber side. The wall opening can correspond in particular to the face surface of the protuberance, which faces away from the cooking chamber.

In one development, that movement position, in which the wall opening is covered by the cover provided on the support, is a "normal position" or "rest position" of the changing device and the other sensor units are only moved in front of the wall opening if required and the normal position is then assumed again. As a result, the sensor units are advantageously only transported to the opening and therewith exposed to the hot and/or contaminated (e.g. as a result of splashes of grease, liquid or vapor) cooking chamber, when a measurement is required. In one development, the changing device is moved back into the rest position immediately after the measurement time of the sensor unit located in front of the opening has elapsed and the sensor unit is as a result brought back into a protected position. As a result, the exposure time for the sensor units is minimal, which also applies to the heat loss from the hot cooking chamber.

In one development, the changing device is provided or equipped at least with an imaging digital camera and an imaging IR camera and in particular also has or provides a cover.

In the case that the changing device has a motor-movable support, on which the at least two sensor units are arranged, in one in particular advantageous embodiment the support is motor-movable and its angular positions can be adjusted so that one of the sensor units can be positioned in front of the opening by rotating the support in each case. The advantage is therefore achieved in that a particularly compact and robust arrangement can be provided. In the case that a cover is also provided on the support, this can be arranged similarly to the sensor units. Here the support can be connected by way of a drive shaft to a motor or to a drive shaft of the motor, for instance. By rotating the drive shaft, predetermined angular positions of the support can be adjusted about its axis of rotation in a targeted manner.

The support can be rotatable within a limited angular range, i.e. in an angular range of less than 360°, or can alternatively be circumferentially rotatable. The support can be connected to the motor or to a drive shaft of the motor by way of a drive shaft. By rotating the motor, predetermined angular positions of the support about its axis of rotation can be adjusted in a targeted manner. The fact that one of the sensor units can be positioned in front of the opening by rotating the support means in particular that each of the sensor units is assigned a specific angular position, in which this sensor unit can detect at least one associated property of the cooking chamber through the opening.

In one embodiment, the sensor units (and possibly the cover) are arranged in an arched manner about an axis of rotation of the support. It is therefore advantageously possible for it to be positioned precisely on the wall opening by means of simple rotation. The arched arrangement can be a circular or ring sector-shaped arrangement.

In one embodiment, the sensor units (and possibly the cover) are aligned radially outward in respect of the axis of rotation of the support. This gives the advantage of a particularly simple and compact arrangement. This embodiment comprises in particular that a measuring field or field of view of the sensor units is aligned radially in relation to the axis of rotation. For instance, an optical axis of a camera can be aligned radially outward in respect of the axis of rotation of the support.

In one development, the axis of rotation of the support is aligned at least approximately parallel to a wall of the cooking chamber wall which has the wall opening. In other words, the axis of rotation of the support is aligned at least approximately at right angles to a perpendicular direction of the wall opening.

The wall of the cooking chamber wall, in which the wall opening is located, can generally be a ceiling, a rear wall, a left side wall, a right side wall or a rear wall, for instance. The wall opening can also be located in a transition between such walls. The wall of the cooking chamber wall can also comprise the door which closes the cooking chamber, since, in the closed state, this likewise shows a region or a side of the cooking chamber wall. In one development, the changing device including the sensor units attached thereto is therefore accommodated in a door of the cooking appliance. This is advantageous in that an angle of observation from the closed door corresponds approximately to the angle of observation of a user, when he opens the door to look in.

In an alternative embodiment, the sensor units are aligned parallel to the axis of rotation of the support, for instance in the manner of a revolver. The axis of rotation of the support then lies in particular at least approximately offset at right angles to a wall of the cooking chamber wall which has the opening or at least approximately offset parallel in relation to a perpendicular direction of the wall opening.

In one embodiment, the support has an arch sector-shaped, in particular ring sector-shaped linear support wall, which is arranged about its axis of rotation, wherein at least two insertion locations for sensor units are provided angularly offset in relation to one another on the support wall. A robust option which is particularly simple to produce is advantageously provided to fasten the sensor units to the support. If a separately manufactured cover is provided, an insertion location can likewise be provided for this. A separately manufactured cover is advantageous in that it can be easily produced from particularly heat-resistant material, e.g. made from ceramics or mirrored metal, compared with the material of the support (e.g. plastic). Alternatively, the cover can be integrated into the support, for which case no specially configured insertion location needs to be provided.

Alternatively to a motor-movable support, the support can be moved or displaced in a motor-translational, in particular linear, manner. Instead of an arched support wall, this can then be embodied e.g. as a flat tape or disk and e.g. be moveable parallel to the cooking chamber wall which has the opening.

The embodiment as a flat disk can also be advantageous, however, if the sensor units are aligned parallel to the axis of rotation of the rotatable support. The support wall can then be embodied as a circular or circular sector-shaped disk, for instance.

In one embodiment, an exterior of the support wall can be moved along in front of the opening in the cooking chamber wall and at least two insertion locations for sensor units are provided offset with respect to one another on an interior of the support wall, each of which has a fastening structure for an associated sensor unit.

The advantage is achieved in that the sensor units can be easily fastened to the support and can also be moved without adjustment precisely in front of the opening in the cooking chamber wall. The fact that an exterior of the support wall can be moved along in front of the opening in the cooking chamber wall means in particular that the support wall (from the perspective of the support) is able to rotate or move translationally along its longitudinal extent in front of the wall opening. The support wall remains here in particular in front of the opening, but depending on the position with another segment. The longitudinal extent of the support wall corresponds to its movement direction, for instance with the rotatability of a peripheral direction of the axis of rotation, in the case that the support can be rotated and the sensor units are aligned radially outward in respect of the axis of rotation of the support.

In one embodiment, at least one of the insertion locations has a window which can be congruent with the wall opening in the cooking chamber wall. On account of making the window congruent with the wall opening, inspection of the cooking chamber can be provided for the respective sensor unit. The window can be e.g. an aperture or hole in the support wall. In one development, all insertion locations provided for the sensor units, (also referred to below as "sensor insertion locations"), have one such window.

The sensor units can be arranged in essentially any sequence on the support wall.

In one embodiment, at least two insertion locations or the associated sensor units are separated from one another by means of a cover, the cover is located in the movement direction of the support, in particular of the support wall, in other words in particular between the at least two insertion locations. The advantage is therefore achieved in that an only minimal movement or travel is required in order to bring insertion locations or the sensor units provided therein out of the rest position in front of the wall opening.

In one embodiment, at least two insertion locations or the associated sensor units are arranged adjacent to one another on an end segment of the support wall and the cover is arranged on the other end segment. As a result, the advantage is achieved in that the insertion locations or the associated sensor units are positioned comparatively far away from the cooking chamber wall in the rest position of the support, in which the wall opening is covered by the cover, and are then exposed to particularly low temperatures.

In one embodiment, the sensor units are arranged in an aeratable manner in the cooking appliance. As a result, they can advantageously be cooled during cooking operation. In one development, the cooking appliance has at least one fan or ventilator, by means of which a flow of cooling air inside the appliance can be generated (forced) in the cooking appliance (typically between the cooking chamber wall and a housing of the cooking appliance). One such flow of cooling air can be a flow of cooling air which is or has already been used to cool other regions, e.g. to cool electronics and/or to cool the door. One such flow of cooling air can also be an independent, in particular also separate flow of cooling air, which leads from the outside to the changing device, in particular to its sensor units. An improved cooling of the sensor units is then generally produced if cooling air is guided directly from the outside or from a cooler base region of the appliance to the sensor units. In particular, the sensor units can be arranged in the flow of cooling air inside the appliance. In one development, the support is embodied to be air-permeable, for instance by providing suitable apertures, slots etc. Alternatively the support wall can be connected to the axis of rotation by way of a frame construction.

In one development, an insertion location has a sleeve which attaches to the inside of a window in a support wall. A region of a sensor unit facing the cooking chamber can be attached, in particular plugged, into the rear of this sleeve, or the sensor unit can be attached (but not introduced) to the sleeve. A front open front face of the sleeve can correspond to the window, while the back or rear open front face is provided as an attachment or insertion opening for the sensor unit. If the sensor unit is a camera, its lens can be attached to the rear of the sleeve (e.g. placed on the sleeve) or inserted into the sleeve. The region of the sensor unit located on or in the sleeve is generally that region which is most significantly exposed to the heat radiation coming from the wall opening and moreover contamination such as splashes of liquid or grease. The sleeve can therefore advantageously be used as a positioning aid and spacer for the associated sensor unit. The sleeve can be penetrated laterally or on the casing side, in order to enable the flow of cooling air to traverse the sleeve. If the sensor unit is inserted or attached into the sleeve, the flow of air routed through the sleeve can bring about a cooling of the associated sensor unit. The sleeve therefore advantageously enables a simple positioning of the associated sensor unit on the support and its cooling in the active and standby position.

In order to protect the sensor unit particularly effectively, in one development the sleeve is embodied as an air flow collector or is connected to an air flow collector. The air flow collector is located in the region of the flow of cooling air of the cooking appliance and is shaped and aligned so that it routes some of the flow of cooling air into the sleeve in a targeted manner On the opposite side of the sleeve, it can have an air outlet opening. The air flow collector then enables a particularly reliable flow of air which traverses the sleeve.

In one development, the air flow collector has a flow cross-section which tapers in the flow direction of the incoming air. As a result, a flow speed of the cooling air is increased in the sleeve, which intensifies a cooling effect. The flow of cooling air can also be strong enough that it now deflects splashes of grease and liquid in front of the sensor unit. The air flow collector therefore advantageously enables a simple positioning of the associated sensor unit on the support, the cooling of which in the active and standby position and a contamination protection in the active position. The air flow collector can be funnel-shaped, for instance, directed with its wider opening against the direction of the cooling air flow and with its narrower opening leading laterally into the sleeve. The sleeve can have an air outlet opening on the opposite side.

In one embodiment, a gap, in particular aeratable by force, is provided between the support wall in the region of the window and the cooking chamber wall in the region of the opening, through which gap a flow of air can be guided. The advantage is likewise achieved in that a sensor unit located in its active position is protected against contamination from the cooking chamber and is cooled.

In one development, the cover covers the opening in the cooking chamber wall without a gap. If all sensor units are located in their standby position (which corresponds to a rest position of the support or the changing device), the cooking chamber opening and the air duct can be closed at the same time by means of the cover. To this end the cover can project on the outside of a support wall, in particular with a height which corresponds or almost corresponds to the gap width, for instance.

Basically the changing device can also combine translational movements and rotational movements and/or it can enable rotational movements of a sensor unit about a number of different axes of rotation. For instance, a changing device can have a base, for instance circular disk-shaped, which can be rotated by motor about a first, in particular vertical, axis of rotation, on which base a number of jibs are rotatably or pivotably attached, wherein a sensor unit is attached to each of the jibs. The axes of rotation of the jibs can each be aligned at right angles to the axis of rotation of the base, e.g. in a horizontal direction, and offset or tilted at an angle in relation to one another, e.g. in the peripheral direction of the first axis of rotation.

The object is also achieved by a method for operating a cooking appliance as described above. The method can be embodied similarly to the cooking appliance and has the same advantages.

In one embodiment, during a cooking operation, at least one of the sensor units is brought from a standby position into an active position if necessary by the changing device moving, a measurement is carried out by means of this sensor unit in the active position and after the measurement this sensor unit is immediately brought back into the standby position by the changing device moving. As a result an exposition time of the sensor units with respect to the cooking chamber is advantageously kept particularly low.

If one of the sensor units is an optical camera, in one development this can be used at the start of a cooking process to identify, measure and/or illustrate food located in the cooking chamber. In another development, the optical camera is then only required in larger time intervals (e.g. of up to five minutes) for a short period for recording an image in order to define a cooking progress of the cooking appliance. If the optical camera is only moved in front of the wall opening in order to record images and after image recording is immediately brought back into the standby position, the thermal load and the risk of contamination are significantly reduced. The optical camera can then advantageously be embodied to be very cost-effective.

An imaging IR camera, particularly during microwave operation (of a rapid mode of operation, which typically has a short cooking duration) may move into the active position at regular intervals for a recording and then move back into the standby position in which it can be thermally cooled and protected against contamination.

A number of (different) sensor units can generally be alternately moved into the active position during a cooking process by means of the changing device. In one development, only one of the sensor units is moved into the active position during a cooking operation by means of the changing device, e.g. an optical camera during a cooking operation using IR radiation elements such as resistance heating elements and an IR camera during microwave operation. To this end, the cooking appliance can be an oven with microwave functionality, for instance.

In general, the alternate or time-discrete use of different sensor units at a shared location is exploited by means of the present cooking appliance. This is particularly advantageous for sensor units, the evaluation of which does not presuppose a continuous or virtually continuous data flow with as many measurements per time unit as possible over a longer period of time. The evaluation of image information for measurement purposes (e.g. an IR evaluation of temperature courses or an optical detection of items of food or light projection patterns) therefore does not require a continuous data flow with as many images per time unit as possible over a longer period of time, as would typically be necessary when transmitting images of moving sequences (film).

The fact that at least one, in particular further property of the cooking chamber can likewise be permanently detected by means of other sensors or sensor devices not arranged on the changing device does not oppose the provision of the changing device. For instance, a temperature sensor for sensing a cooking chamber temperature can be arranged (in the cooking chamber, for instance) so that it can measure the cooking chamber temperature continuously or virtually continuously and the changing device has an optical camera and an IR camera. A humidity sensor and/or at least one chemical sensor, depending on technical specifications, can also be provided permanently or on the changing device.

BRIEF DESCRIPTION OF THE DRAWINGS

The afore-described properties, features and advantages of this invention and the manner in which these are achieved will become clearer and more intelligible in conjunction with the following schematic description of an exemplary embodiment which is explained in more detail in conjunction with the drawings.

DETAILED DESCRIPTION OF EXEMPLARY EMBODIMENTS OF THE PRESENT INVENTION

Figure 1:
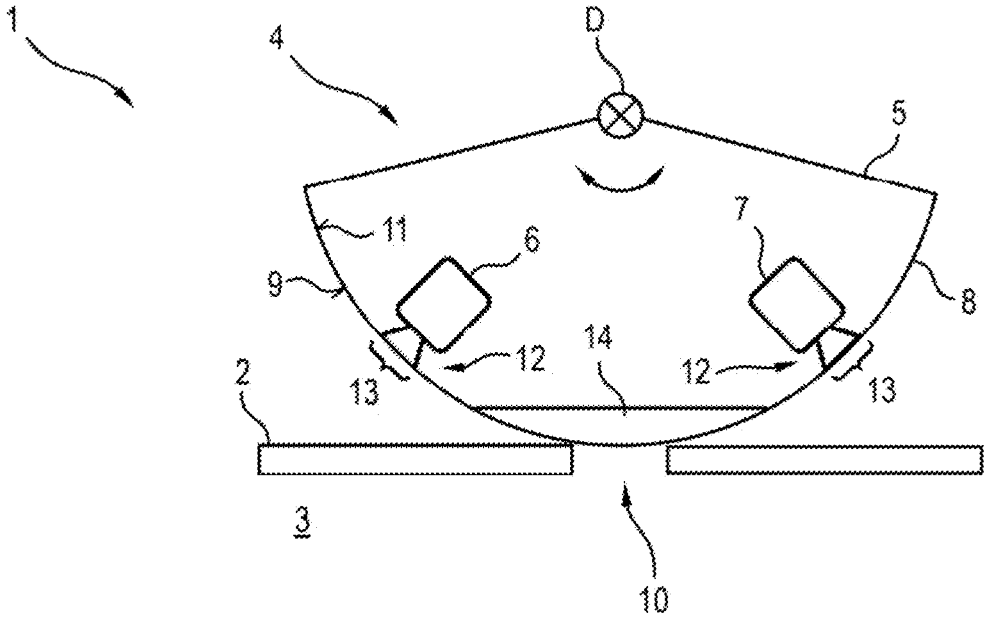
FIG. 1 shows as a sectional representation in a side view a schematic of a cutout from a cooking appliance according to a first exemplary embodiment in the region of a changing device, which is in a rest position.

FIG. 1 shows, as a sectional representation in the side view, a schematic of a cutout from a cooking appliance 1, which has a cooking chamber 3 delimited by means of a cooking chamber wall 2. A motor-movable changing device 4, which is shown in its rest position, is provided outside the cooking chamber 3. The changing device 4 here has a support 5 which can be rotated by motor about an axis of rotation D, on which support two sensor units are arranged, namely an optical camera 6 and an IR camera 7. The motor for rotating the support 5 is not shown, but can be a stepped motor, for instance.

The support 5 here has an arch sector-shaped, in particular ring sector-shaped linear support wall 8 arranged about its axis of rotation D. An exterior 9 of the support wall 8 can be moved in front of a wall opening 10 in the cooking chamber wall 2, in particular can be moved therebeyond. The subregion of the cooking chamber wall 2 having the wall opening 10 is here a ceiling of the cooking chamber 2. The optical camera 6 and the IR camera 7 are fastened to the interior 11 of the support wall 8 at corresponding insertion locations 12. They are directed through a respective window 13 in the support wall 8 and therefore have a field of view which can be seen through the respective window 13. The cameras 6 and 7 are therefore likewise arranged in an arch shape about the axis of rotation D of the support, and moreover aligned radially outward in respect of the axis of rotation D.

Also provided on the support wall 8 is a cover 14, which is arranged here along the support wall 8 or in the peripheral direction of the axis of rotation D between the optical camera 6 and the IR camera 7 or its insertion locations 12. The optical camera 6 and the IR camera 7 or its insertion locations 12 are therefore separated from one another in the rotational direction by the cover 14. The optical camera 6, the IR camera 7 and the cover 14 are arranged offset in relation to one another in the peripheral or rotational direction, in particular equidistantly.

By rotating the support 5 about the axis of rotation, e.g. by means of a control device (not shown), the optical camera 6, the IR camera 7 and the cover 14 can be positioned alternately in front of the wall opening 10. In this exemplary embodiment, the axis of rotation D is parallel to the cooking chamber wall 2. If an optical image or an IR image is to be recorded from the cooking chamber 3, for instance, the support 5 is rotated into an angular position, in which the window 13 associated with the insertion location 12 of the optical camera 6 or the IR camera 7 is congruent with the wall opening 10. The cooking chamber 3 is therefore visible for the optical camera 6 or the IR camera 7 through the respective window 13 and the wall opening 10. In this "active position" of the optical camera 6 or the IR camera 7, this can record at least one image from the cooking chamber 3.

If the optical camera 6 and the IR camera 7 are not required, the support 5 is rotated into its rest position in which both cameras 6, 7 are in their "standby position". Now the cover 14 covers the wall opening 10, in particular in a tight manner. The cover 14 instead of the cameras 6 and 7 can therefore be rotated in front of the wall opening 10. The arrangement with the cover 14 between the two cameras 6 and 7 is advantageous in that only a slight rotation is required, in order to bring the cameras 6 and 7 out of their standby position in front of the wall opening 10 into their active position.

Figure 2:
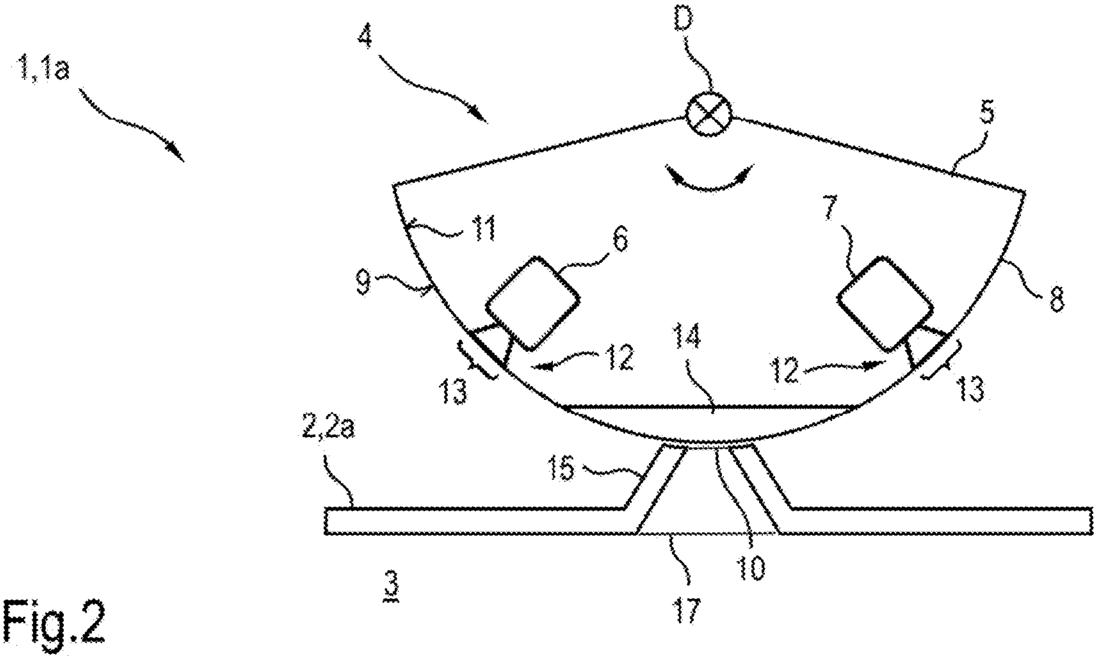
FIG. 2 shows, in a representation similar to FIG. 1, a variant of a cooking appliance according to the first exemplary embodiment with a differently shaped cooking chamber wall.

FIG. 2 shows, in a representation similar to FIG. 1, a variant 1*a* of the cooking appliance 1 with a differently shaped development 2*a* of the cooking chamber wall 2. Namely in the region of the wall opening 10, the cooking chamber wall 2, 2*a* has a protuberance 15 or recess directed out from the cooking chamber 3. The protuberance 15 is embodied to be tubular, in particular truncated cone- or funnel-shaped and has the wall opening 10 on its inner front face. This variant has the general advantage that the cameras 6, 7 (and generally the sensor units) are positioned far away from the possibly hot cooking chamber wall 2 and therefore are installed in a cooler environment. Easier cooling is therefore also enabled, since a higher thermal resistivity is produced as a result of the larger distance from the rest of the cooking chamber wall 2 or the cooking chamber 3. The protuberance 15 can be produced by molding (e.g. deep-drawing, embossing etc.) the cooking chamber wall 2. Alternatively, the protuberance 15 can be a separately manufactured component which is then connected to the rest of the cooking chamber wall 2. As a result, the advantage is achieved in that the protuberance 15 can be embodied to reduce the heat conductivity particularly effectively. It can be produced from a poorly heat-conducting ceramic, for instance.

On account of the optional funnel or truncated cone shape of the protuberance 15, the further advantage is achieved that the field of view of the cameras 6, 7 is not restricted or not noticeably restricted.

A further advantage which is important to microwave devices (e.g. standalone microwave devices or ovens with additional microwave function) consists in the protuberance 15 being able to be embodied as a microwave barrier, since a passage of microwaves through the wall opening 10 can thus be prevented. To this end, the protuberance 15 is generally a tube which is so narrow that no wave propagation through the tube is possible. The here optional funnel shape of the protuberance 15 intensifies its sealing effect, so that the microwave density is already reached after a brief period.

Figure 3:
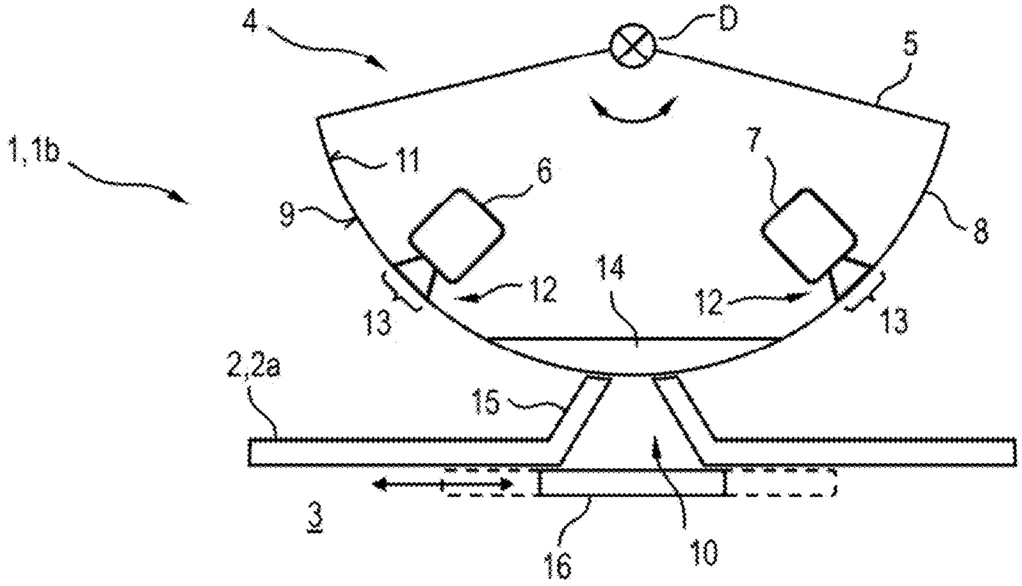
FIG. 3 shows, in a representation similar to FIG. 1, another variant of the cooking appliance according to the first exemplary embodiment with an additional protective panel.

FIG. 3 shows, in a representation similar to FIG. 1, another variant 1*b* of the cooking appliance 1 with a protuberance 15 and additionally a protective panel 16. This cooking appliance 1, 1*b* is therefore shown as a development of the cooking appliance 1*a,* but the protective panel 16 can however also be generally used, e.g. with the cooking appliance 1 without a protuberance 15. Basically the protective panel 16 can be provided alternatively or in addition to the cover 14. The protective panel 16 consists here of a cost-effective glass which is transparent for visible light but impermeable for (N) IR radiation. It is motor-movable e.g. as shown on the cooking chamber side parallel to the cooking chamber wall 2*a* and the wall opening 10. The protective panel 16 can represent a part of the changing device 4 or can be controlled separately thereto.

The movement of the protective panel 16 can be controlled as follows, for instance: in the rest position of the support 5 the protective panel 16 also covers the protuberance 15, namely its front face 17 on the cooking chamber side. The cover 14 and the protective panel 16 are then arranged at a distance of several millimeters to a few centimeters from one another and in particular aligned parallel to one another. This dual protection against heat and contamination from the cooking chamber 3 is advantageous particularly during a pyrolysis operation.

The protective panel 16 itself has a dual effect: on the one hand it creates a partition and as a result prevents hot air from rising up to the sensor surface and also a penetration of splashes of liquid and grease, on the other hand it can be embodied from poorly heat-conducting material (therefore e.g. glass or glass ceramic are poorly heat-conducting compared with steel), as a result of which the heat conduction of the cooking chamber wall 2*a* likewise increases in the region of the protuberance 15. In one development of the protective panel 16, as indicated with dashes, it is embodied to be significantly larger than the front face of the protuberance on the cooking chamber side, in other words projects laterally noticeably beyond this front face. In this way the heat resistance of the cooking chamber wall 2*a* covered thereby increases so that less heat flows in the direction of the protuberance 15 and the cameras 6, 7.

If the optical camera 6 is in its active position, the protective panel 16 which is transparent thereto remains in front of the protuberance 15 and as a result protects the optical camera 6 from heat and contamination from the cooking chamber 3. If the IR camera 7 is in its active position, the protective panel 16 is moved away from the protuberance 15 and therefore releases this.

The protuberance 15 can be embodied to be air-permeable, e.g. punched or generally perforated, in order as a result to further reduce the heat conduction. This reduction in the heat conduction can be particularly effective when the protuberance 15 is in a region of a cooling air flow of the cooking appliance 1.

Figure 4:
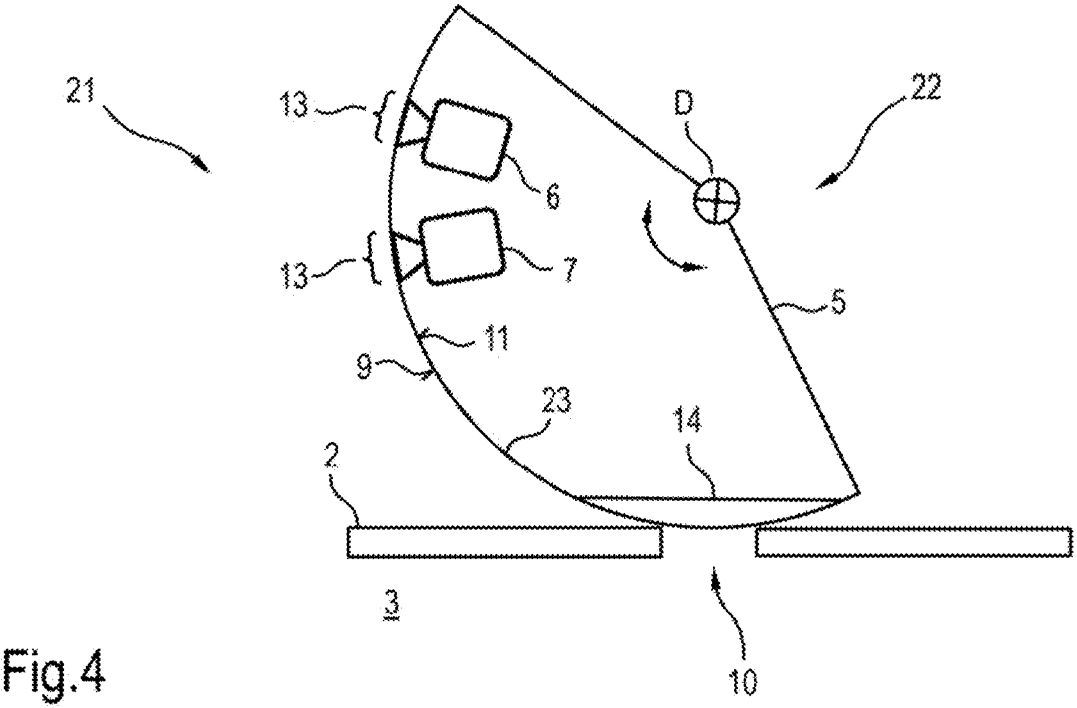
FIG. 4 shows, in a representation similar to FIG. 1, the cooking appliance according to a second exemplary embodiment with a further changing device in the rest position.

FIG. 4 shows, in a representation similar to FIG. 1, a cooking appliance 21 with a changing device 22 in the rest position. The cooking appliance 21 is designed similarly to the cooking appliance 1, 1*a* or 1*b,* but with the changing device 22 the two insertion locations 12 or the two cameras 6, 7 are arranged in the peripheral direction or direction of rotation adjacent to one another on an end section of the support wall 23 and the cover 14 is arranged on the other end section of the support wall 23. As a result, the advantage is achieved in that the cameras 6 and 7 in the rest position of the changing device 22 are positioned comparatively far away from the cooking chamber wall 2 and the wall opening 10 and are then exposed to comparatively low temperatures.

Figure 5:
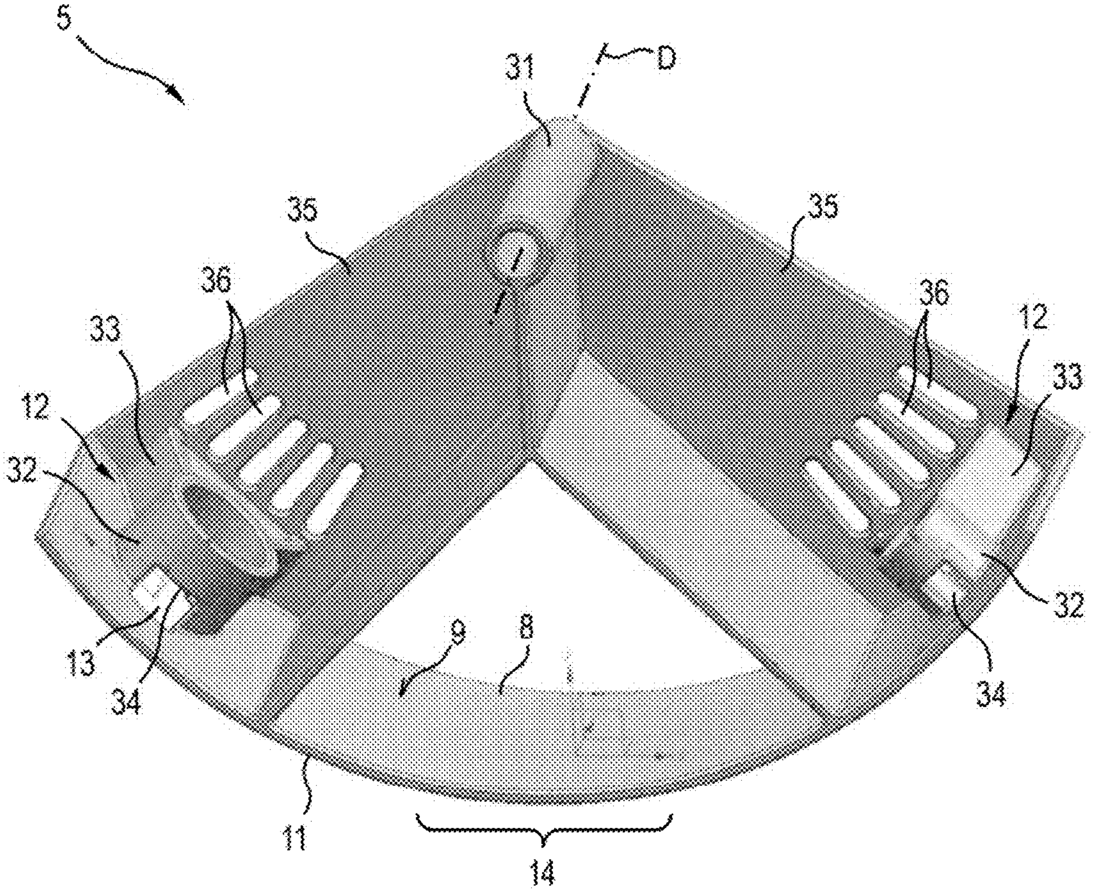
FIG. 5 shows, in an oblique view, a construction example of a support of the changing device of the cooking appliance according to the first exemplary embodiment.

FIG. 5 shows an oblique view of a more detailed design example of the support 5 of the changing device 4. The support 5 has a central pipe 31 for attaching to a drive shaft of the motor. The arched support wall 8 has two insertion locations 12 with in each case one sleeve 32 aligned radially in relation to the axis of rotation D. An outer open front face of the sleeves 32 corresponds to the respective window 13. Can be attached to the other inner front face in the respective camera 6 or 7, in particular its respective lens. A funnel-shaped air flow collector 33, which is directed into a region of an internal flow of cooling air of the cooking appliance 1, leads laterally into the sleeves 32 in each case. An air exit opening 34 is provided in the sleeve 32 on the opposite side. This arrangement makes it possible for an air flow to traverse the respective sleeve 32 and as a result to deflect splashes of grease and liquid escaping from the cooking chamber 3, and/or to reduce a temperature on the cameras 6, 7, when the camera 6 or 7 is in its active position.

Here the support 5 has disk-shaped regions 35 laterally in relation to the insertion locations 12, which extend from the pipe 31 to the support wall 8 and serve to mechanically stabilize. In order to be able to cool the cameras 6 and 7 particularly effectively through the internal flow of cooling air, at the height of the cameras 6 and 7 the disk-shaped regions 35 each have ventilation slots 36 for their ventilation.

Figure 6:
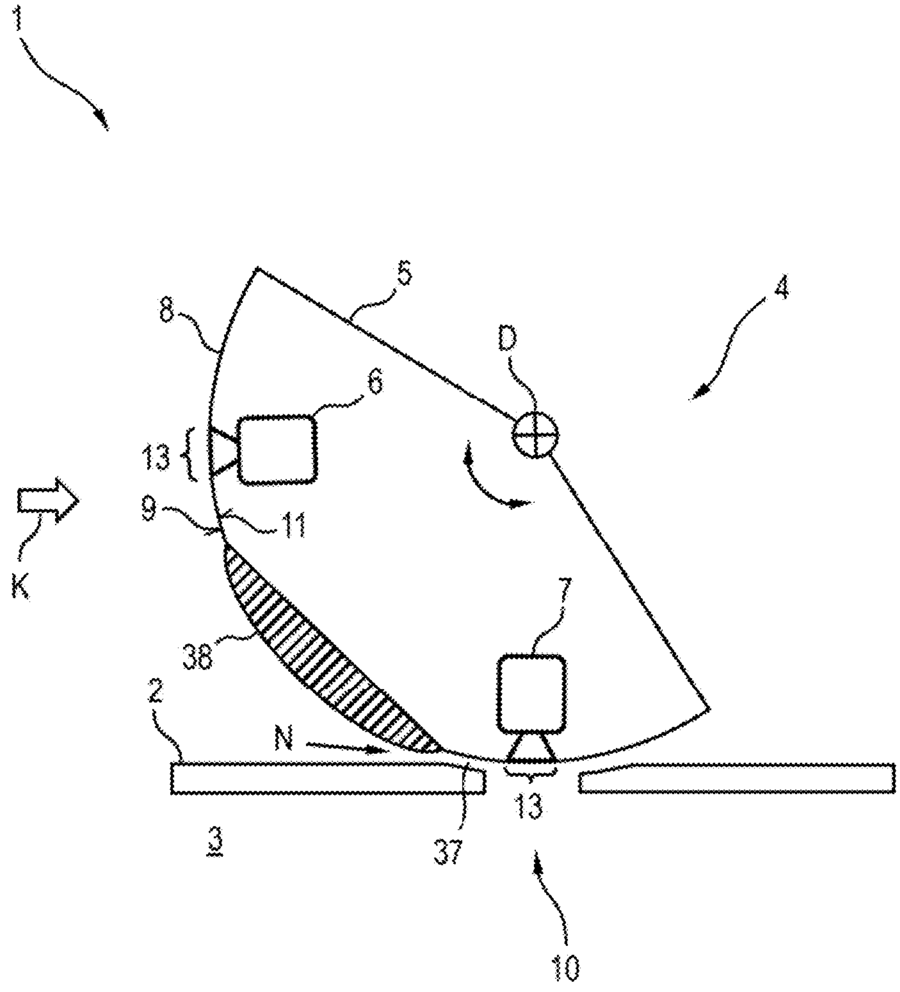
FIG. 6 shows, as a sectional representation in the side view, a schematic of a cutout from a variant of the cooking appliance according to the first exemplary embodiment in the region of the changing device.

FIG. 6 shows, as a sectional representation in the side view, a schematic of a cutout from a variant of the cooking appliance 1 in the region of the support 5. In this, a gap 37 which is aeratable by force is provided in the region of the wall opening 10 between the exterior 9 of the support wall 8 and the cooking chamber wall 2. The fact that the gap 37 is aeratable by force may mean that a bypass air flow N of the internal flow of cooling air K flows through it. To this end the support wall 8 can be embodied and/or arranged so that it effects the branching of the bypass air flow N.

The cover 38 can, as shown, project slightly beyond the exterior 9, so that when the support 5 is in the rest position and the cover 38 then faces the wall opening 10, the gap 37 is closed.

The arrangement according to FIG. 6 can be used alternatively or in addition to the arrangement according to FIG. 5 and fulfils the same purpose.

Figure 7:
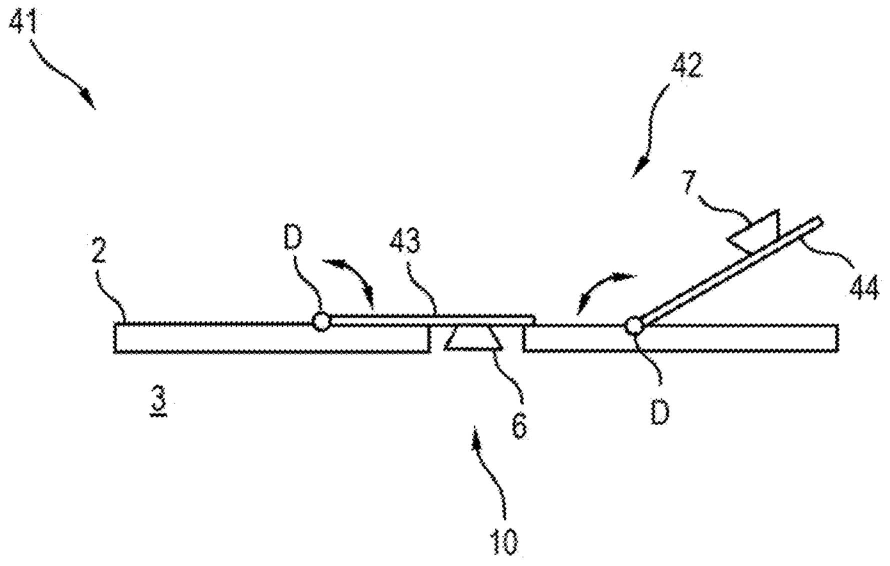
FIG. 7 shows, as a sectional representation in a side view, a schematic of a cutout from a cooking appliance according to a third exemplary embodiment in the region of a changing device.

FIG. 7 shows, as a sectional representation in a side view, a schematic of a cutout from a cooking appliance 41 in the region of a changing device 42. The cooking appliance 41 can have a similar basic structure to the cooking appliance 1, 1*a* or 1*b*, but the changing device 42 now has a number of motor-movable supports 43 and 44, on which a sensor unit, here e.g. the optical camera 6 and the IR camera 7, is arranged in each case. The supports 43 and 44 are arranged individually pivotable in the region of an exterior of the cooking chamber wall 2 and are arranged here in symmetry with the wall opening 10. Alternately the supports 43 and 44 can be rotated or pivoted between their folded-out standby position and their folded-down active position (in which the camera 6 or 7 is arranged on the wall opening 10).

In one variant, not shown, a further support may be provided, which is embodied as a cover or has a cover 4. If this support is folded down, the cover closes the wall opening 10 and the changing device 42 is in its rest position. The more than two supports are then advantageously arranged in the shape of a ring about the wall opening 10.

Figure 8:
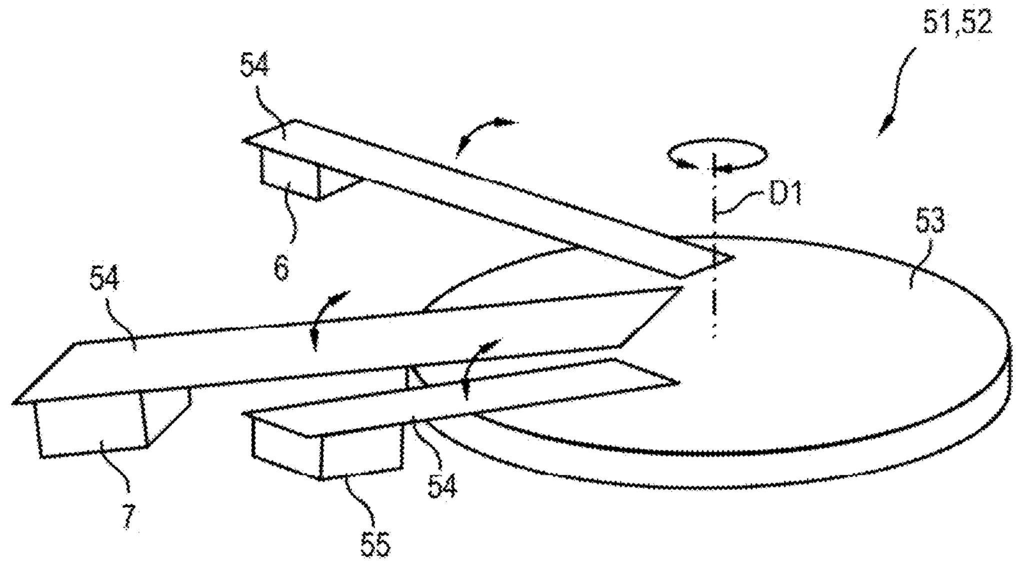
FIG. 8 shows in a view obliquely from above a changing device of a cooking appliance according to a fourth exemplary embodiment.

FIG. 8 shows, in a view obliquely from above, a significantly simplified schematic of a changing device 52 of a cooking appliance 51. The changing device 52 now has a here circular disk-shaped base (base disk) 53, which can be rotated by motor about a first, here vertical axis of rotation D1. Three radially aligned pivotable supports ("jibs") 54 are attached to the base disk 53 angularly offset about the axis of rotation D1. The cameras 6 and 7 and a cover 55 are arranged on the undersides of the free end sections of the jibs 54. The cameras 6 and 7 are therefore aligned substantially parallel to the first axis of rotation D1.

The base disk 53 positions the jibs 54, which can then be raised and lowered flexibly in accordance with the installation space available in the cooking appliance 51. This movement of the jibs 54 about a respective horizontal second axis of rotation (top Fig) can also be referred to as pitching motion. On account of their in particular individually adjustable pitching motion, the jibs 54 can swerve obstacles during the rotation of the base disk 53, (e.g. by temporarily lowering or raising during the rotation), in their active position can be lowered sufficiently deep in relation to the cooking chamber wall 2 and in their standby position can be raised high for optimal cooling or to minimally influence functional spaces arranged therebelow (e.g. of cooling air guides).

The present invention is naturally not restricted to the exemplary embodiment shown.

Embodiments of the above exemplary embodiments can also be implemented in other exemplary embodiments, if possible. For instance, the embodiments according to FIG. 2, FIG. 3, FIG. 5 and FIG. 6, can be applied analogously to the cooking appliance 21.

Generally "a", "an", etc. may be understood to mean a singular or a plural, in particular in the sense of "at least one" or "one or more", etc. provided this is not explicitly excluded, for example by the expression "exactly one", etc.

Numerical data may comprise exactly the specified number and also a usual tolerance range, provided this is not explicitly excluded.

The invention claimed is:

1. A cooking appliance, comprising:

a cooking chamber wall delimiting a cooking chamber and including an opening; and a motor-movable changing device arranged outside the cooking chamber and including at least two sensor units for detecting a property of the cooking chamber, said changing device capable of being set in such a way by motorized movement that one of the at least two sensor units is positionable in front of the opening at a time for detecting the property of the cooking chamber through the opening, wherein the changing device includes a motor-movable support, on which the at least two sensor units are arranged, and the support is motor-rotatable for adjustment into angular positions such that one of the at least two sensor units is positionable in front of the opening by rotating the support.

2. The cooking appliance of claim 1, wherein at least one of the sensor units is a member selected from the group consisting of an optical camera, a temperature sensor, a substance sensor, and a humidity sensor.

3. The cooking appliance of claim 2, wherein the temperature sensor is an IR camera.

4. The cooking appliance of claim 1, wherein the at least two sensor units are arranged in an arch-shape about an axis of rotation of the support.

5. The cooking appliance of claim 1, wherein the at least two sensor units are aligned radially outward in respect of an axis of rotation of the support.

6. The cooking appliance of claim 1, wherein the at least two sensor units are aligned parallel to an axis of rotation of the support.

7. The cooking appliance of claim 1, wherein the support has a linear support wall arranged in a manner of an arch sector about its axis of rotation, said support wall having an exterior being movable in front of the opening in the cooking chamber wall, said support wall having an interior with at least two insertion locations provided in offset relation to one another for the at least two sensor units, respectively, each of the at least two insertion locations having a fastening structure for an associated one of the at least two sensor units and a window which can be congruent with the opening in the cooking chamber wall.

8. The cooking appliance of claim 7, wherein the changing device includes a cover and is adjustable such that the cover is positionable in front of the opening, said cover being configured to separate the at least two insertion locations from one another.

9. The cooking appliance of claim 7, wherein the changing device includes a cover and is adjustable such that the cover is positionable in front of the opening, wherein the at least two insertion locations are arranged adjacent to one another on one end section of the support wall and the cover is arranged on another end section of the support wall.

10. The cooking appliance of claim 1, wherein the changing device includes a cover and is adjustable such that the cover is positionable in front of the opening, instead of the at least two sensor units.

11. The cooking appliance of claim 1, wherein the at least two sensor units are arranged to be aeratable.

12. The cooking appliance of claim 1, wherein a gap which is aeratable by force is provided in a region of the opening between the support and the cooking chamber wall.

13. The cooking appliance of claim 1, wherein the cooking chamber wall is molded as a protuberance in a region of the opening.

14. The cooking appliance of claim 1, further comprising a protective panel movable by motor in front of the opening, said protective panel being permeable for at least one of the at least two sensor units by measurement technology and impermeable for another one of the at least two sensor units by measurement technology.

15. A method for operating a cooking appliance having a motor-movable changing device arranged outside a cooking chamber and including at least two sensor units, said method comprising:

moving during cooking operation at least one of the at least two sensor units by the changing device from a standby position into an active position such that the one of the at least two sensor units is positioned in front of an opening of a cooking chamber wall, the cooking chamber wall molded as a protuberance in a region of the opening;

carrying out in the active position a measurement by the at least one of the at least two sensor units for detecting a property of the cooking chamber through the opening; and immediately returning by the changing device the at least one of the at least two sensor units back into the standby position after the measurement.

16. The method of claim 15, further comprising aerating the at least two sensor units.

17. The method of claim 15, further comprising moving a protective panel in front of the opening to provide protection against heat and contamination from the cooking chamber.

18. A cooking appliance, comprising:

a cooking chamber wall delimiting a cooking chamber and including an opening; and a motor-movable changing device arranged outside the cooking chamber and including at least two sensor units for detecting a property of the cooking chamber, said changing device capable of being set in such a way by motorized movement that one of the at least two sensor units is positionable in front of the opening at a time for detecting the property of the cooking chamber through the opening, wherein the changing device includes a number of motor-movable supports, one of the at least two sensor units being arranged in on one of the motor-movable supports and the other one of the at least two sensor units being arranged in on the other one of the motor-movable supports.

* * * * *